United States Patent
Sawada et al.

(10) Patent No.: US 9,919,617 B2
(45) Date of Patent: Mar. 20, 2018

(54) CONTROL DEVICE FOR ELECTRIC MOTOR VEHICLE AND CONTROL METHOD FOR ELECTRIC MOTOR VEHICLE

(71) Applicant: Nissan Motor Co., Ltd., Kanagawa (JP)

(72) Inventors: Akira Sawada, Kanagawa (JP); Ken Ito, Kanagawa (JP); Takashi Nakajima, Kanagawa (JP); Yuji Katsumata, Kanagawa (JP); Hiroyuki Komatsu, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 122 days.

(21) Appl. No.: 15/110,603

(22) PCT Filed: Jan. 5, 2015

(86) PCT No.: PCT/JP2015/050066
§ 371 (c)(1),
(2) Date: Jul. 8, 2016

(87) PCT Pub. No.: WO2015/105077
PCT Pub. Date: Jul. 16, 2015

(65) Prior Publication Data
US 2016/0347202 A1 Dec. 1, 2016

(30) Foreign Application Priority Data
Jan. 10, 2014 (JP) .................. 2014-003179

(51) Int. Cl.
*B60L 15/20* (2006.01)
*B60L 7/14* (2006.01)
(Continued)

(52) U.S. Cl.
CPC ............ *B60L 15/2009* (2013.01); *B60L 7/14* (2013.01); *B60L 7/18* (2013.01); *B60L 11/1803* (2013.01);
(Continued)

(58) Field of Classification Search
CPC .......... B60L 15/2009; B60L 7/18; B60L 7/14; B60L 11/1803; B60L 15/20;
(Continued)

(56) References Cited

U.S. PATENT DOCUMENTS

| 6,086,166 A | 7/2000 | Fukasawa | |
| 2010/0004806 A1* | 1/2010 | Soma ................... | B60K 6/445 701/22 |

(Continued)

FOREIGN PATENT DOCUMENTS

| EP | 2 810 811 A1 | 12/2014 |
| JP | 8-79907 A | 3/1996 |

(Continued)

*Primary Examiner* — Yuen H Wong
(74) *Attorney, Agent, or Firm* — Osha Liang LLP

(57) ABSTRACT

A control device for electric motor vehicle using a motor as a traveling drive source and configured to decelerate by a regenerative braking force of the motor includes a motor torque command value setter configured to set a first torque target value for traveling based on the vehicle information as a motor torque command value for traveling based on the vehicle information before a speed parameter proportional to a traveling speed of an electric motor vehicle becomes equal to or less than a predetermined value, and set a second torque target value for stopping the electric motor vehicle and maintaining a vehicle stopped state as the motor torque command value when the speed parameter becomes equal to or less than the predetermined value, a motor controller configured to control the motor on the basis of the motor torque command value.

16 Claims, 14 Drawing Sheets

(51) Int. Cl.
  *B60L 11/18* (2006.01)
  *B60L 7/18* (2006.01)
(52) U.S. Cl.
  CPC ........... *B60L 15/20* (2013.01); *B60L 2220/58* (2013.01); *B60L 2240/12* (2013.01); *B60L 2240/421* (2013.01); *B60L 2240/423* (2013.01); *B60L 2240/429* (2013.01); *B60L 2240/642* (2013.01); *B60L 2250/26* (2013.01); *B60L 2260/44* (2013.01); *B60L 2270/145* (2013.01); *B60Y 2300/181* (2013.01); *B60Y 2300/18091* (2013.01); *B60Y 2300/20* (2013.01); *Y02T 10/645* (2013.01); *Y02T 10/7005* (2013.01); *Y02T 10/7275* (2013.01); *Y02T 10/7291* (2013.01); *Y02T 90/16* (2013.01)
(58) Field of Classification Search
  CPC ........... B60L 2220/58; B60L 2240/429; B60L 2270/145; B60L 2240/421; B60L 2240/12; B60L 2260/44; B60L 2250/26; B60L 2240/642; B60L 2240/42; B60Y 2300/20; B60Y 2300/18091; B60Y 2300/181; Y02T 10/7005; Y02T 90/16; Y02T 10/645; Y02T 10/7275; Y02T 10/7291

See application file for complete search history.

(56) References Cited

U.S. PATENT DOCUMENTS

2013/0116874 A1  5/2013  Ichinose et al.
2014/0379190 A1  12/2014  Sawada

FOREIGN PATENT DOCUMENTS

| JP | 2007-143350 A | 6/2007 |
| JP | 2011-259645 A | 12/2011 |
| JP | 2013-158178 A | 8/2013 |

* cited by examiner

CONTROL DEVICE FOR ELECTRIC MOTOR VEHICLE AND CONTROL METHOD FOR ELECTRIC MOTOR VEHICLE

CROSS-REFERENCE TO RELATED APPLICATIONS

This application is national stage application of PCT/JP2015/050066, filed Jan. 5, 2015, and claims foreign priority to Japanese Patent Application 2014-003179, filed on Jan. 10, 2014, the contents of which are hereby incorporated by reference in their entirety.

BACKGROUND

Technical Field

The present invention relates to a control device for electric motor vehicle and a control method for electric motor vehicle.

Related Art

Conventionally, a regenerative brake control device for electric vehicles is known which is provided with setting means capable of arbitrarily setting a regenerative braking force of a motor and regenerates the motor by the regenerative braking force set by the setting means (see JP8-79907A).

SUMMARY OF INVENTION

However, if the regenerative braking force set by the setting means is large, vibration in a front-back direction of a vehicle body may be generated when the electric vehicle is decelerated by the set regenerative braking force and the speed becomes zero.

One or more embodiments of the present invention may suppress the generation of vibration in a front-back direction of a vehicle body in stopping an electric motor vehicle with a regenerative braking force.

A device for controlling an electric vehicle according to one or more embodiments of the present invention comprises a control device for electric motor vehicle using an electric motor 4 as a traveling drive source and configured to decelerate by a regenerative braking force of the electric motor 4 calculates a first torque target value on the basis of vehicle information and calculates a second torque target value which converges to zero with a reduction in a speed parameter proportional to a traveling speed of the electric motor vehicle. If the vehicle is determined to have not reached a just-before-stop moment, the first torque target value is set as a motor torque command value. If the vehicle is determined to stop shortly, the second torque target value is set as the motor torque command value. The electric motor 4 is controlled on the basis of the set motor torque command value.

DETAILED DESCRIPTION

Figure 1:
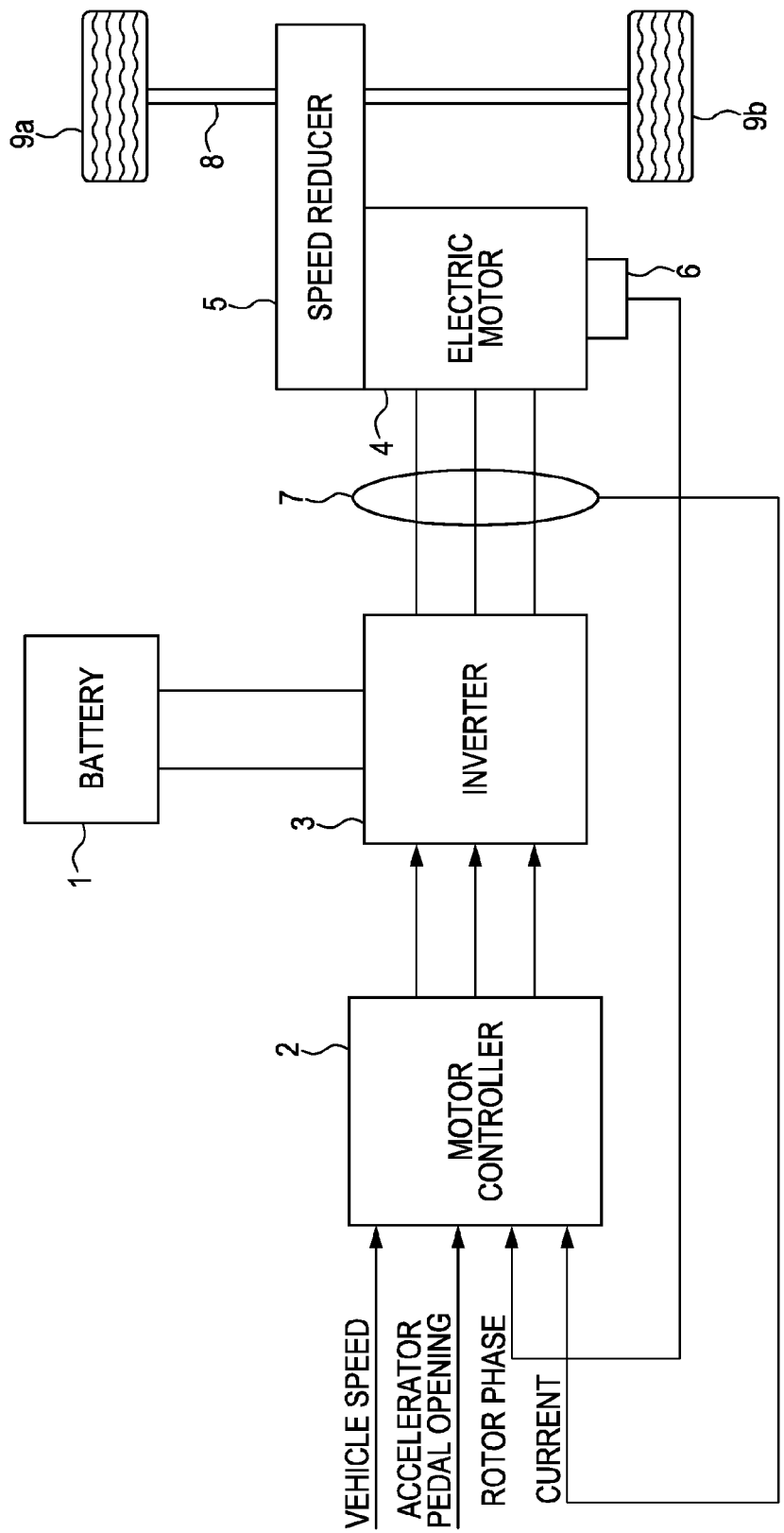
FIG. 1 is a block diagram showing a main configuration of an electric vehicle with a control device for the electric motor vehicle according to one or more embodiments of the present invention.

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a block diagram showing a main configuration of an electric vehicle with a control device for the electric motor vehicle according to one or more embodiments of the present invention. The control device for electric motor vehicle according to one or more embodiments of the present invention includes an electric motor as part or the entirety of a drive source of the vehicle and is applicable to an electric motor vehicle capable of traveling by a drive force of the electric motor. Electric motor vehicles include not only electric vehicles, but also hybrid vehicles and fuel cell vehicles. Particularly, the control device for electric motor vehicle according to one or more embodiments of the present invention can be applied to a vehicle capable of controlling the acceleration/deceleration and the stop of the vehicle only by the operation of an accelerator pedal. In this vehicle, a driver depresses the accelerator pedal during acceleration and reduces or zeros the amount of depression of the accelerator pedal during deceleration or during stop.

A motor controller 2 has signals indicating vehicle states such as a vehicle speed V, an accelerator pedal opening AP, a rotor phase α of an electric motor (three-phase AC motor) 4 and currents iu, iv and iw of the electric motor 4 input thereto in the form of digital signals, and generates PWM signals for controlling the electric motor 4 on the basis of the input signals. Further, the motor controller 2 generates a drive signal for an inverter 3 in accordance with the generated PWM signals.

The inverter 3 includes, for example, two switching elements (e.g. power semiconductor elements such as IGBTs or MOS-FETs) for each phase, converts a direct current supplied from a battery 1 into an alternating current by turning on and off the switching elements in accordance with the drive signal and causes a desired current to flow into the electric motor 4.

The electric motor 4 generates a drive force by the alternating current supplied from the inverter 3 and transmits the drive force to left and right drive wheels 9a, 9b via a speed reducer 5 and a drive shaft 8. Further, when being rotated following the rotation of the drive wheels 9a, 9b during the travel of the vehicle, the electric motor 4 generates a regenerative drive force, thereby collecting the kinetic energy of the vehicle as electrical energy. In this case, the inverter 3 converts an alternating current generated during the regenerative operation of the electric motor 4 into a direct current and supplies it to the battery 1.

A current sensor 7 detects three-phase alternating currents iu, iv and iw flowing in the electric motor 4. However, since the sum of the three-phase alternating currents is 0, the currents of two arbitrary phases may be detected and the current of the remaining one phase may be obtained by calculation.

A rotation sensor 6 is, for example, a resolver or an encoder and detects the rotor phase α of the electric motor 4.

Figure 2:
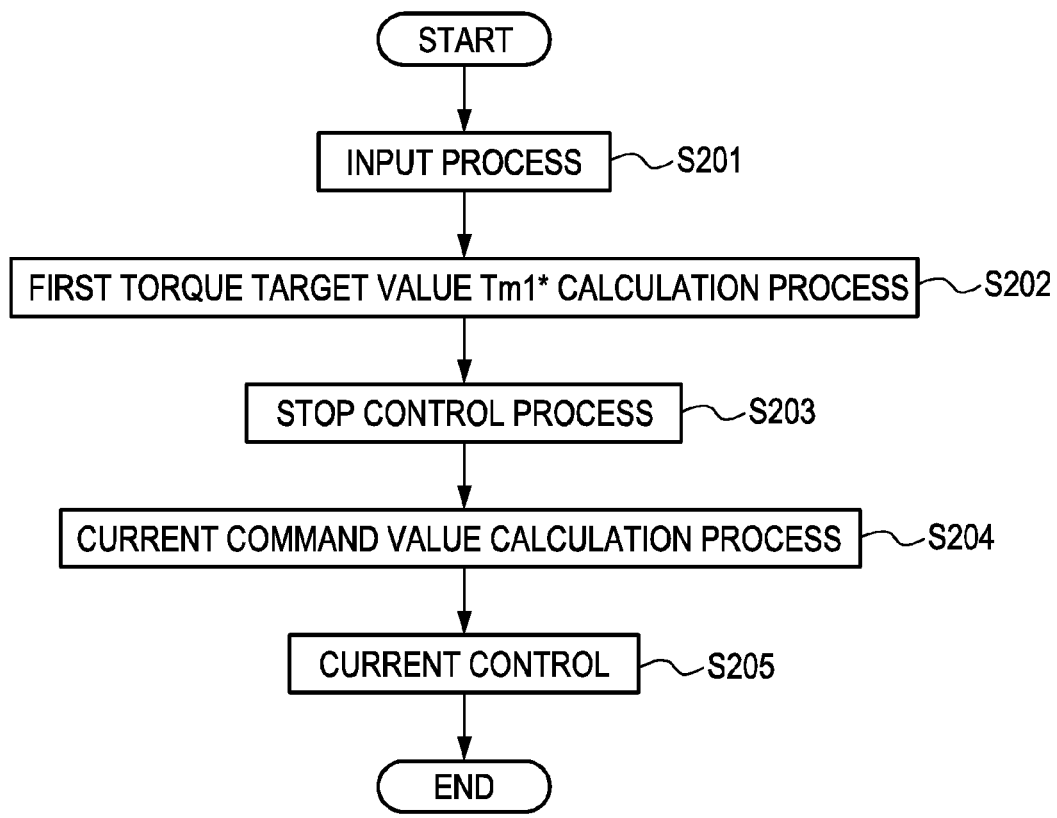
FIG. 2 is a flow chart showing the flow of a motor current control process performed by a motor controller according to one or more embodiments of the present invention.

FIG. 2 is a flow chart showing the flow of a motor current control process performed by the motor controller 2.

In Step S201, signals indicating the vehicle states are inputted. Here, the vehicle speed V (km/h), the accelerator pedal opening AP (%), the rotor phase α (rad) of the electric motor 4, a rotation speed Nm (rpm) of the electric motor 4, the three-phase alternating currents iu, iv and iw flowing in the electric motor 4 and a direct-current voltage value Vdc (V) between the battery 1 and the inverter 3 are inputted.

The vehicle speed V (km/h) is obtained by an unillustrated vehicle speed sensor or through communication from another controller. Alternatively, a vehicle speed v (m/s) is obtained by multiplying a rotor mechanical angular velocity ωm by a tire dynamic radius R and dividing the product by a gear ratio of a final gear, and then multiplied by 3600/1000 for unit conversion, thereby obtaining the vehicle speed V (km/h).

The accelerator pedal opening AP (%) is obtained from an unillustrated accelerator pedal opening sensor or through communication from another controller such as an unillustrated vehicle controller.

The rotor phase α (rad) of the electric motor 4 is obtained from the rotation sensor 6. The rotation speed Nm (rpm) of the electric motor 4 is obtained by dividing a rotor angular velocity ω (electric angle) by a pole pair number P of the electric motor 4 to obtain a motor rotation speed ωm (rad/s), which is a mechanical angular velocity of the electric motor 4, and multiplying the obtained motor rotation speed ωm by 60/(2π). The rotor angular velocity ω is obtained by differentiating the rotor phase α.

The currents iu, iv and iw (A) flowing in the electric motor 4 are obtained from the current sensor 7.

The direct-current voltage value Vdc (V) is obtained from a voltage sensor (not shown) provided in a direct-current power supply line between the battery 1 and the inverter 3 or a power supply voltage value transmitted from a battery controller (not shown).

In Step S202, a first torque target value Tm1* is set. Specifically, a torque table target value (basic torque target value) Tm0* is first set on the basis of the accelerator pedal opening AP and the motor rotation speed ωm input in Step S201 by referring to an accelerator opening-torque table shown in FIG. 3. Subsequently, a disturbance torque estimated value Td to be described later is obtained and a disturbance correction torque Td* is obtained on the basis of the disturbance torque estimated value Td. Then, the first torque target value Tm1* is set by adding the torque table target value T0* and the disturbance correction torque Td*.

In Step S203, a stop control process is performed to execute such a control that the electric motor vehicle stops. Specifically, a just-before-stop moment of the electric motor vehicle is judged, the first torque target value Tm1* calculated in Step S202 is set as a motor torque command value Tm* before the just-before-stop moment, and a second torque target value Tm2* which converges to the disturbance torque estimated value Td with a reduction in the motor rotation speed is set as the motor torque command value Tm* after the just-before-stop moment. This second torque target value Tm2* is a positive torque on an uphill road, a negative torque on a downhill road and substantially zero on a flat road. In this way, a vehicle stopped state can be maintained regardless of a gradient of a road surface as described later. The detail of the stop control process is described later.

In Step S204, a d-axis current target value id* and a q-axis current target value iq* are obtained on the basis of the motor torque target value Tm* calculated in Step S203, the motor rotation speed ωm and the direct-current voltage value Vdc. For example, a table defining a relationship of the d-axis current target value and the q-axis current target value with the torque command value, the motor rotation speed and the direct-current voltage value is prepared in advance and the d-axis current target value id* and the q-axis current target value iq* are obtained by referring to this table.

In Step S205, a current control is executed to match a d-axis current id and a q-axis current iq with the d-axis current target value id* and the q-axis current target value iq* obtained in Step S204. To this end, the d-axis current id and the q-axis current iq are first obtained on the basis of the three-phase alternating current values iu, iv and iw and the rotor phase α of the electric motor 4 input in Step S201. Subsequently, d-axis and q-axis voltage command values vd, vq are calculated from deviations between the d-axis and q-axis current command values id*, iq* and the d-axis and q-axis currents id, iq. It should be noted that a non-interference voltage necessary to cancel out an interference voltage between d-q orthogonal coordinate axes may be added to the calculated d-axis and q-axis voltage command values vd, vq.

Subsequently, three-phase alternating-current voltage command values vu, vv and vw are obtained from the d-axis and q-axis voltage command values vd, vq and the rotor phase α of the electric motor 4. Then, PWM signals tu (%), tv (%) and tw (%) are obtained from the obtained three-phase alternating-current voltage command values vu, vv and vw and the direct-current voltage value Vdc. By opening and closing the switching elements of the inverter 3 by the PWM signals tu, tv and tw obtained in this way, the electric motor 4 can be driven with a desired torque instructed by the torque command value Tm*.

Figure 4:
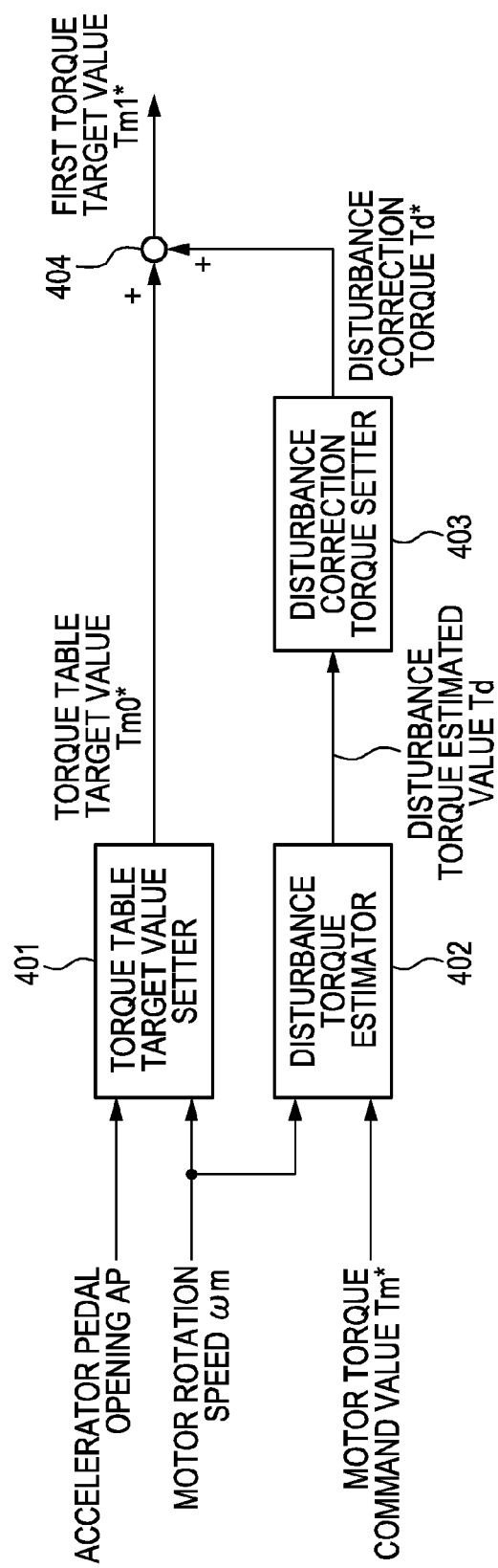
FIG. 4 is a block diagram showing in detail a method for setting a first torque target value Tm1* according to one or more embodiments of the present invention.

A process performed in Step S202 of FIG. 2, i.e. a method for setting the first torque target value Tm1* is described in detail using FIG. 4.

Figure 3:
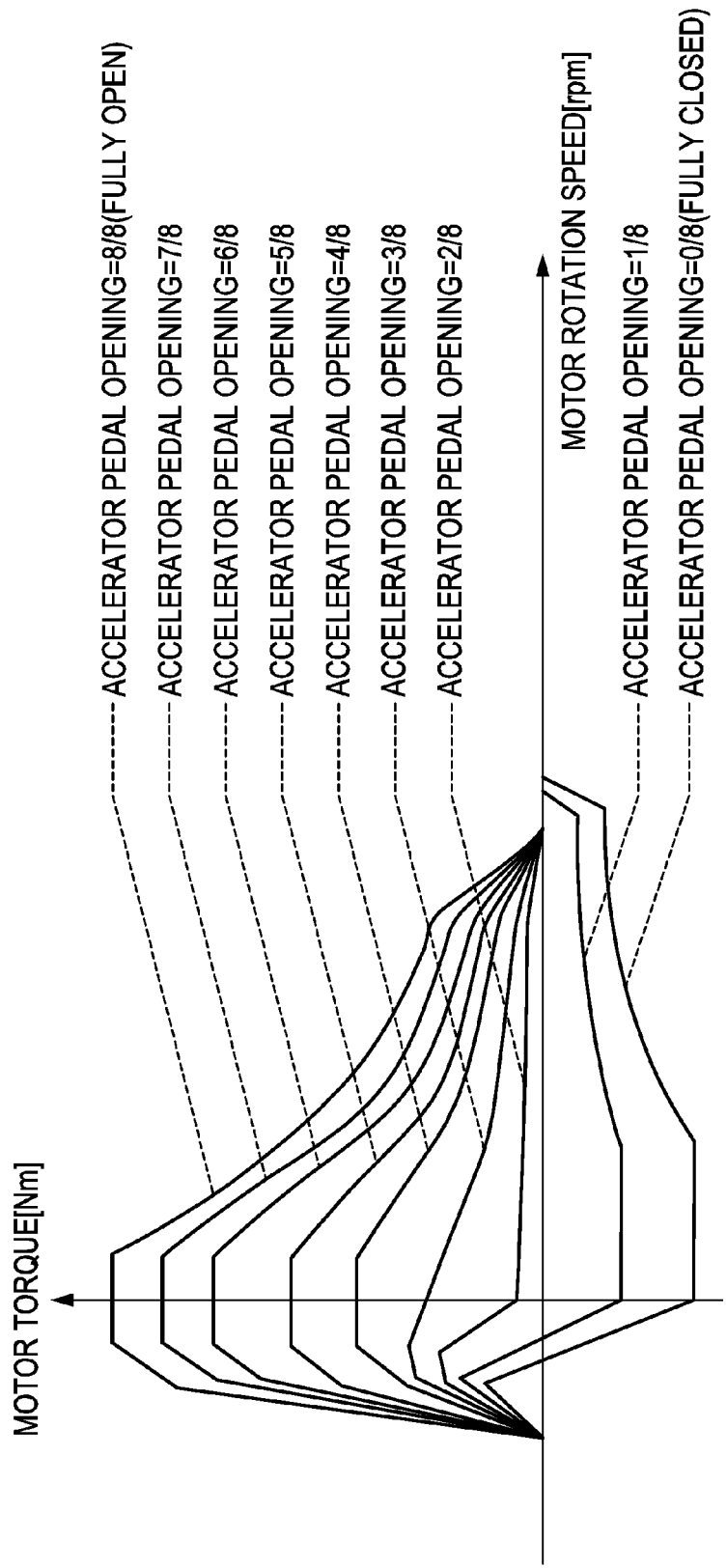
FIG. 3 is a graph showing an example of an accelerator pedal opening-torque table according to one or more embodiments of the present invention.

A torque table target value setter 401 sets the torque table target value Tm0* on the basis of the accelerator pedal opening AP and the motor rotation speed $\omega$m by referring to the accelerator pedal opening-torque table shown in FIG. 3.

A disturbance torque estimator 402 obtains the disturbance torque estimated value Td on the basis of the motor torque command value Tm* and the motor rotation speed $\omega$m.

Figure 5:
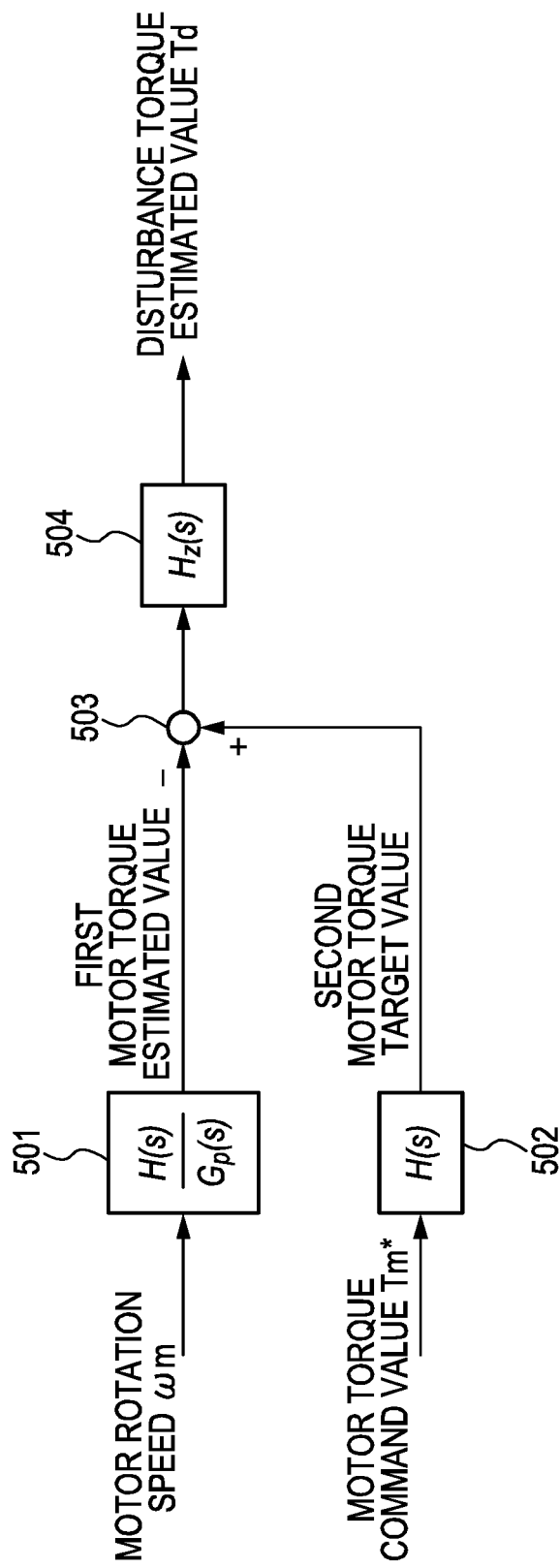
FIG. 5 is a block diagram showing a detailed configuration of a disturbance torque estimator according to one or more embodiments of the present invention.

FIG. 5 is a block diagram showing a detailed configuration of the disturbance torque estimator 402. The disturbance torque estimator 402 includes a control block 501, a control block 502, a subtractor 503 and a control block 504.

The control block 501 functions as a filter having a transmission characteristic H(s)/Gp(s) and calculates a first motor torque estimated value by filtering the motor rotation speed $\omega$m input thereto. Gp(s) is a transmission characteristic from a motor torque Tm to the motor rotation speed $\omega$m and described in detail later. H(s) is a low-pass filter having such a transmission characteristic that a difference between the denominator degree and the numerator degree thereof is not smaller than a difference between the denominator degree and the numerator degree of a model Gr(s).

A control block 502 functions as a low-pass filter having a transmission characteristic H(s) and calculates a second motor torque estimated value by filtering the motor torque command value Tm* input thereto.

A subtractor 503 calculates the disturbance torque estimated value Td by subtracting the first motor torque estimated value from the second motor torque estimated value.

In one or more embodiments of the present invention, the disturbance torque estimated value Td is calculated by filtering a deviation between the second motor torque estimated value and the first motor torque estimated value by the control block 504. The control block 504 functions as a filter having a transmission characteristic Hz(s) and calculates the disturbance torque estimated value Td by filtering the deviation between the second motor torque estimated value and the first motor torque estimated value input thereto. Hz(s) is described in detail later.

A disturbance correction torque setter 403 of FIG. 4 obtains the disturbance correction torque Td* on the basis of the disturbance torque estimated value Td calculated by the disturbance torque estimator 402.

Figure 6:
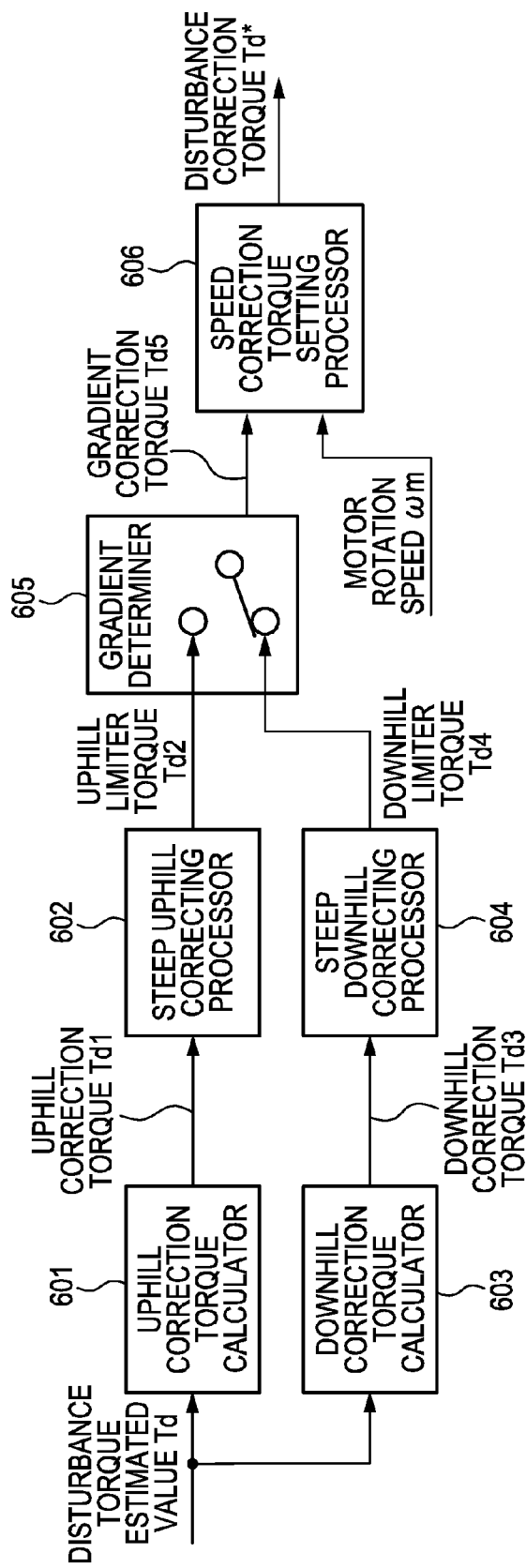
FIG. 6 is a block diagram showing a detailed configuration of a disturbance correction torque setter according to one or more embodiments of the present invention.

FIG. 6 is a block diagram showing a detailed configuration of the disturbance correction torque setter 403. The disturbance correction torque setter 403 includes an uphill correction torque calculator 601, a steep uphill correcting processor 602, a downhill correction torque calculator 603, a steep downhill correcting processor 604, a gradient determiner 605 and a speed correction torque setting processor 606.

The uphill correction torque calculator 601 calculates an uphill correction torque Td1 by multiplying the disturbance torque estimated value Td by a predetermined correction gain Kup.

The steep uphill correcting processor 602 applies a limiter processing to the uphill correction torque Td1 on the basis of a motor torque command value of the accelerator pedal opening-torque table shown in FIG. 3 when the "accelerator pedal opening=0/4 (fully closed)", and calculates an uphill limiter torque Td2 after the limiter processing.

The downhill correction torque calculator 603 calculates a downhill correction torque Td3 by multiplying the disturbance torque estimated value Td by a predetermined downhill correction gain Kdown.

The steep downhill correcting processor 604 calculates a downhill limiter torque Td4 of making a deceleration of the vehicle constant when an absolute value of the disturbance torque estimated value Td is not smaller than a predetermined value such as on a steep downhill slope. Specifically, the deceleration of the vehicle on the steep downhill slope is specified, and the required downhill limiter torque Td4 is calculated from the motor torque command value of the accelerator pedal opening-torque table shown in FIG. 3 when the "accelerator pedal opening=0/4 (fully closed)" and the disturbance torque estimated value Td.

The gradient determiner 605 determines a gradient of a road surface on the basis of a sign of the disturbance torque estimated value Td and sets the uphill limiter torque Td2 as the gradient correction torque Td5 on an uphill slope (disturbance torque estimated value Td>0) while setting the downhill limiter torque Td4 as the gradient correction torque Td5 on a downhill slope (disturbance torque estimated value Td<0).

It should be noted that a table defining a relationship of the disturbance torque estimated value Td and the gradient correction torque Td5 may be prepared in advance and the gradient correction torque Td5 may be calculated on the basis of the disturbance torque estimated value Td by referring to this table.

Figure 7:
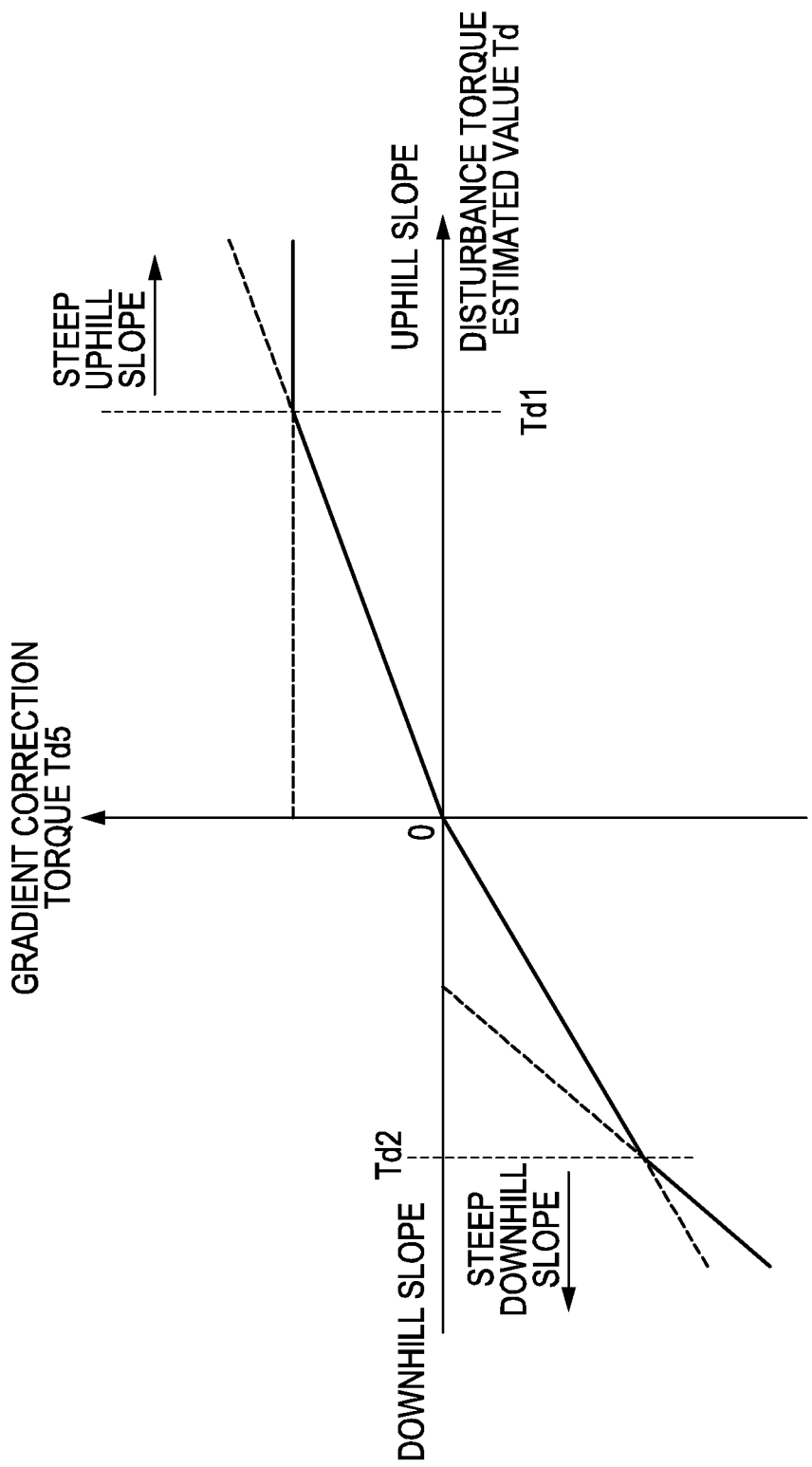
FIG. 7 is a graph showing an example of a table defining a relationship of a disturbance torque estimated value Td and a gradient correction torque Td5 according to one or more embodiments of the present invention.

FIG. 7 is a graph showing an example of the table defining the relationship of the disturbance torque estimated value Td and the gradient correction torque Td5. In the case of a steep uphill road surface, i.e. if the disturbance torque estimated value Td is not smaller than a predetermined value Td1, the gradient correction torque Td5 is set at a predetermined upper limit value. Further, in the case of an uphill road which is not a steep uphill slope, i.e. if the disturbance torque estimated value Td is larger than 0 and below the predetermined value Td1, the gradient correction torque Td5 is set at a smaller value (however, Td5>0) as the disturbance torque estimated value Td becomes smaller. In the case of a downhill road which is not a steep downhill slope, i.e. if the disturbance torque estimated value Td is smaller than 0 and larger than a predetermined value Td2, the gradient correction torque is set at a smaller value (however, Td5<0) as the disturbance torque estimated value Td becomes smaller. In the case of a steep downhill road surface, i.e. if the disturbance torque estimated value Td is not larger than the predetermined value Td2, the gradient correction torque is set at a smaller value (however, Td5<0) as the disturbance torque estimated value Td becomes smaller. However, in the case of a steep downhill slope, the gradient correction torque Td5 is set at an even smaller value as the disturbance torque estimated value becomes smaller as compared to a downhill road which is not a steep downhill slope.

The speed correction torque setting processor 606 of FIG. 6 obtains a speed correction gain K$\omega$ on the basis of the motor rotation speed $\omega$m by referring to a table defining a relationship of the motor rotation speed $\omega$m and the speed correction gain K$\omega$ and calculates the disturbance correction torque Td* by multiplying the gradient correction torque Td5 by the speed correction gain K$\omega$.

Figure 8:
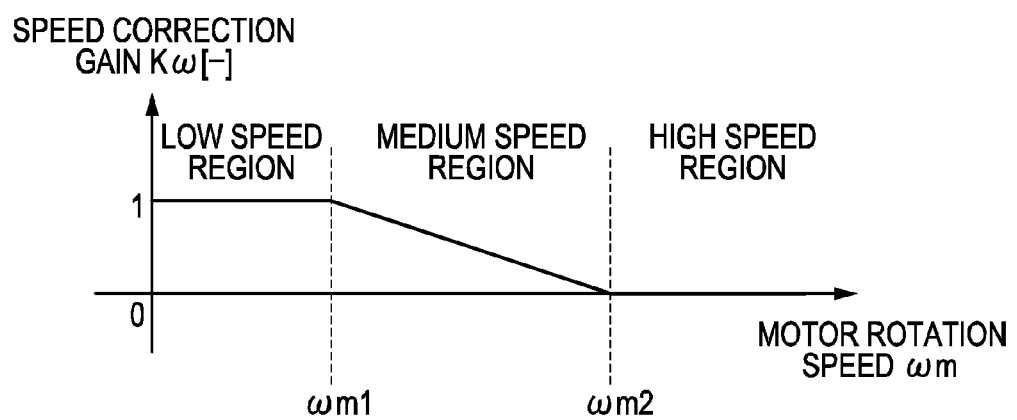
FIG. 8 shows an example of a table defining a relationship of a motor rotation speed $\omega m$ and a speed correction gain $K\omega$ according to one or more embodiments of the present invention.

FIG. 8 shows an example of the table defining the relationship of the motor rotation speed $\omega$m and the speed correction gain K$\omega$. The speed correction gain K$\omega$ is set at 1 in a low speed region where the motor rotation speed ωm is lower than a predetermined rotation speed ωm1, and set at 0 in a high speed region where the motor rotation speed ωm is not lower than a predetermined rotation speed ωm2 (ω1<ω2). In this way, the gradient correction torque Td5 is outputted as the disturbance correction torque Td* in the low speed region and set at 0 in the high speed region. Further, in a medium speed region where the motor rotation speed ωm is not lower than the predetermined rotation speed ωm1 and below the predetermined rotation speed ωm2, the speed correction gain is set to become smaller as the motor rotation speed ωm increases.

Referring back to FIG. 4, the description is continued. An adder 404 calculates the first torque target value Tm1* by adding the torque table target value Tm0* set by the torque table target value setter 401 and the disturbance correction torque Td* set by the disturbance correction torque setter 403.

Since the deceleration until the just-before-stop moment is judged can be adjusted by calculating the first torque target value Tm1* by the aforementioned method, the amount of change from a deceleration being reduced to a deceleration when the motor torque command value Tm* is converged to the disturbance torque estimated value Td to stop the vehicle can be suppressed and the drive feeling can be improved.

Next, before the stop control process performed in Step S203 is described, the transmission characteristic Gp(s) from the motor torque Tm to the motor rotation speed ωm is described in the control device for electric motor vehicle according to one or more embodiments of the present invention.

Figure 9:
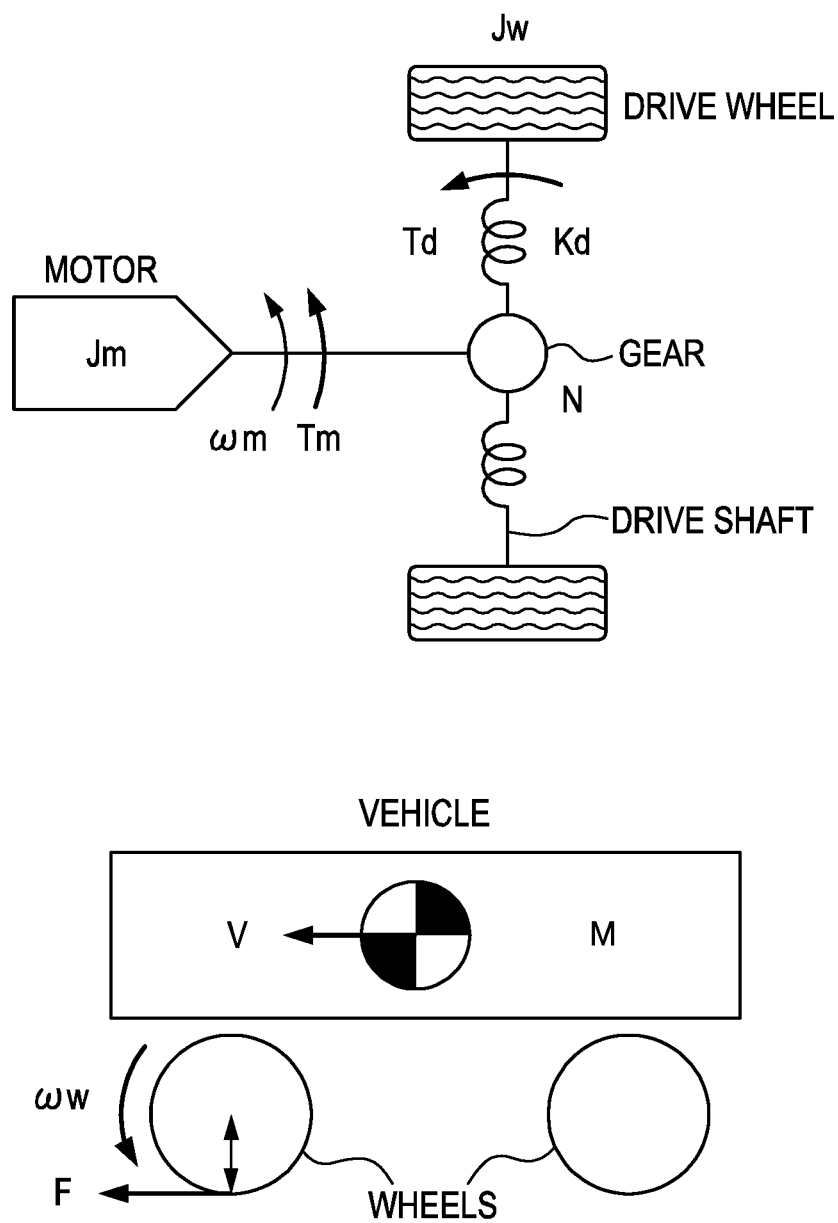
FIG. 9 is a diagram modeling a drive force transmission system of the vehicle according to one or more embodiments of the present invention.

FIG. 9 is a diagram modeling a drive force transmission system of the vehicle and each parameter in FIG. 9 is as below.

$J_m$: inertia of electric motor
$J_w$: inertia of drive wheels
M: weight of vehicle
$K_d$: torsional rigidity of drive system
$K_t$: coefficient relating friction between tires and road surface
N: overall gear ratio
r: load radius of tires
$\omega_m$: angular velocity of electric motor
$T_m$: torque target value
$T_d$: torque of drive wheels
F: force applied to vehicle
V: speed of vehicle
$\omega_w$: angular velocity of drive wheels The following motion equations can be derived from FIG. 9. However, asterisk (*) attached to the right-upper corner of a symbol in equations (1) to (3) indicates a time differential.

[Equation 1]

$$J_m \cdot \omega_m^* = T_m - T_d/N \quad (1)$$

[Equation 2]

$$2J_w \cdot \omega_w^* = T_d - rF \quad (2)$$

[Equation 3]

$$M \cdot V^* = F \quad (3)$$

[Equation 4]

$$T_d = K_d \int (\omega_m/N - \omega_w) dt \quad (4)$$

[Equation 5]

$$F = K_t \cdot (r\omega_w - V) \quad (5)$$

The transmission characteristic Gp(s) from the torque target value Tm to the motor rotation speed ωm of the electric motor 4 obtained on the basis of the motion equations (1) to (5) is expressed by the following equation (6).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

Here, each parameter in equation (6) is expressed by the following equations (7).

[Equations 7]

$$a_4 = 2J_m J_w M$$

$$a_3 = J_m(2J_w + Mr^2)K_t$$

$$a_2 = (J_m + 2J_w/N^2)M \cdot K_d$$

$$a_1 = (J_m + 2J_w/N^2 + Mr^2/N^2)K_d \cdot K_t$$

$$b_3 = 2J_w \cdot M$$

$$b_2 = (2J_w + Mr^2)K_t$$

$$b_1 = M \cdot K_d$$

$$b_0 = K_d \cdot K_t \quad (7)$$

The poles and zero point of the transmission function shown in equation (6) can be approximated to a transmission function of the following equation (8) and one pole and one zero point indicate values extremely close to each other. This is equivalent to that α and β of the following equation (8) indicate values extremely close to each other.

[Equation 8]

$$G_p(s) = \frac{(s + \beta)(b_3' s^2 + b_1' s + b_0')}{s(s + \alpha)(a_3' s^2 + a_2' s + a_1')} \quad (8)$$

Accordingly, by performing pole-zero cancellation (approximation to α=β) in equation (8), Gp(s) constitutes a transmission characteristic of (second order)/(third order) as shown in the following equation (9).

[Equation 9]

$$G_p(s) = \frac{(b_2' s^2 + b_1' s + b_0')}{s(a_3' s^2 + a_2' s + a_1')} \quad (9)$$

Figure 10:
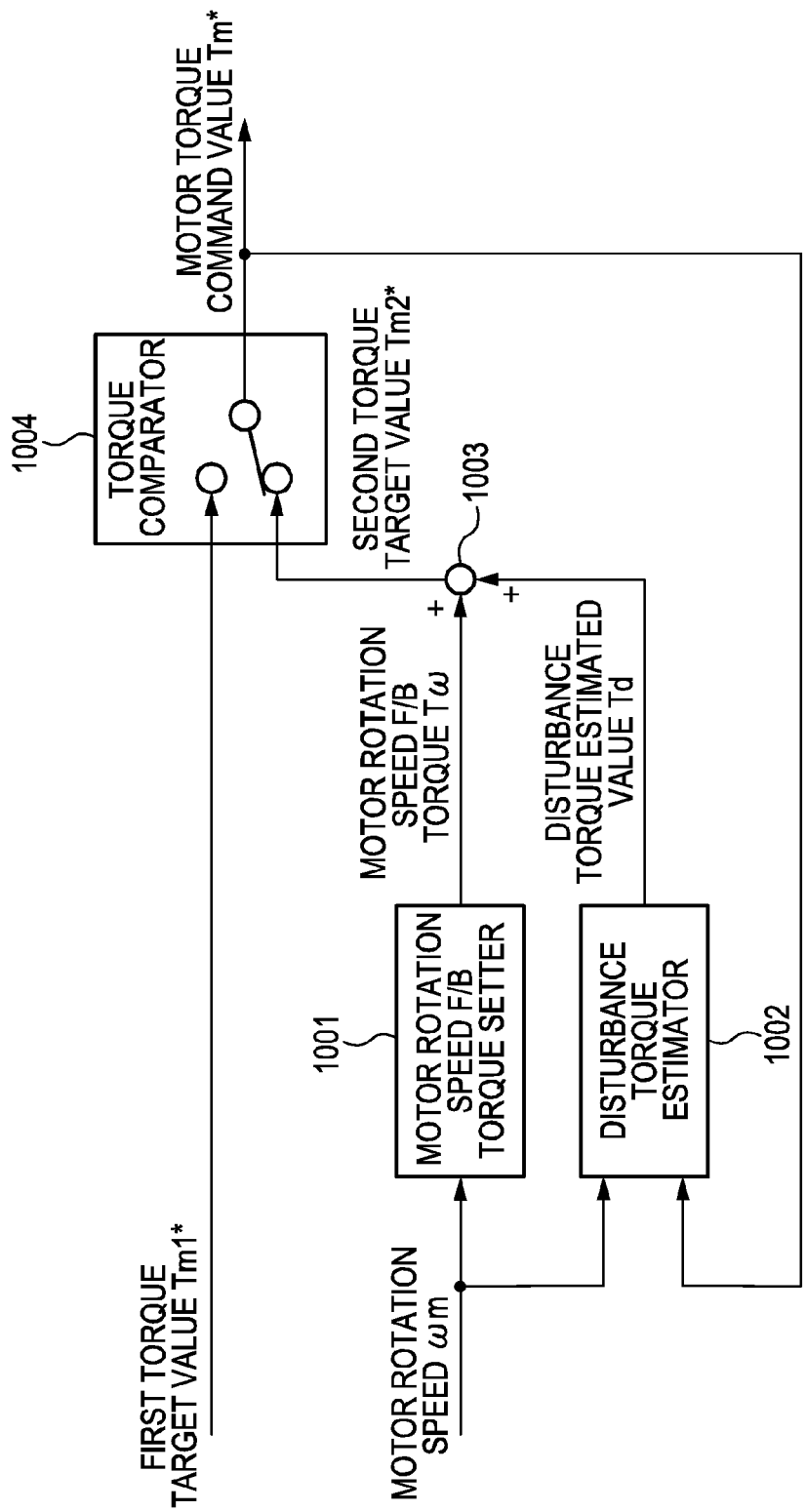
FIG. 10 is a block diagram for realizing a stop control process according to one or more embodiments of the present invention.

Next, the detail of the stop control process performed in Step S203 of FIG. 2 is described. FIG. 10 is a block diagram for realizing the stop control process.

A motor rotation speed F/B torque setter 1001 calculates a motor rotation speed feedback torque (hereinafter, referred to as a motor rotation speed F/B torque) Tω on the basis of the detected motor rotation speed ωm.

Figure 11:
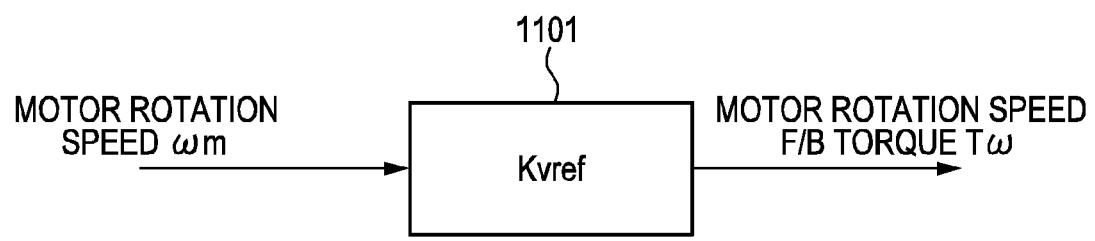
FIG. 11 is a diagram showing a method for calculating a motor rotation speed F/B torque $T\omega$ on the basis of the detected motor rotation speed $\omega m$ according to one or more embodiments of the present invention.

FIG. 11 is a diagram showing a method for calculating the motor rotation speed F/B torque Tω on the basis of the detected motor rotation speed ωm. The motor rotation speed F/B torque setter 1001 includes a multiplier 1101 and calculates the motor rotation speed F/B torque Tω by multiplying the motor rotation speed ωm by a gain Kvref.

However, Kvref is a negative (minus) value necessary to stop the electric motor vehicle just before the electric motor vehicle stops, and appropriately set, for example, from experimental data or the like. The motor rotation speed F/B torque Tω is set as a torque capable of achieving a larger regenerative braking force as the motor rotation speed ωm increases.

It should be noted that although the motor rotation speed F/B torque setter 1001 is described to calculate the motor rotation speed F/B torque Tω by multiplying the motor rotation speed ωm by the gain Kvref, the motor rotation speed F/B torque Tω may be calculated using a regenerative torque table defining a regenerative torque in relation to the motor rotation speed ωm, an attenuation rate table storing an attenuation rate of the motor rotation speed ωm in advance or the like.

Referring back to FIG. 10, description is continued. A disturbance torque estimator 1002 calculates the disturbance torque estimated value Td on the basis of the detected motor rotation speed ωm and the motor torque command value Tm*. The configuration of the disturbance torque estimator 1002 is the same as that of the disturbance torque estimator 402 of FIG. 4, i.e. the configuration shown in FIG. 5.

Here, the transmission characteristic Hz(s) of the control block 504 of FIG. 5 is described. The following equation (10) is obtained by rewriting equation (9). $\zeta_z$, $\omega_z$, $\zeta_p$ and $\omega_p$ in equation (10) are expressed by equations (11).

[Equation 10]

$$G_p(s) = \frac{M_p(s^2 + 2\zeta_z \cdot \omega_z \cdot s + \omega_z^2)}{s(s^2 + 2\zeta_p \cdot \omega_p \cdot s + \omega_p^2)} \quad (10)$$

[Equations 11]

$$\xi_z = \frac{b_1'}{2(b_0' \cdot b_2')^{1/2}} \quad \omega_z = \left(\frac{b_0'}{b_2'}\right)^{1/2} \quad (11)$$

$$\xi_p = \frac{a_2'}{2(a_1' \cdot a_3')^{1/2}} \quad \omega_p = \left(\frac{a_1'}{a_3'}\right)^{1/2}$$

From the above, Hz(s) is expressed by the following equation (12). However, $\zeta_c > \zeta_z$. Further, $\zeta_c > 1$ to enhance a vibration suppressing effect in a deceleration scene accompanied by the backlash of the gear.

[Equation 12]

$$H_z(s) = \frac{(s^2 + 2\zeta_z \cdot \omega_z \cdot s + \omega_z^2)}{s(s^2 + 2\zeta_c \cdot \omega_z \cdot s + \omega_z^2)} \quad (12)$$

It should be noted that although the disturbance torque is estimated by a disturbance observer as shown in FIG. 5 according to one or more embodiments of the present invention, it may be estimated using a meter such as a vehicle longitudinal G sensor.

Here, air resistance, a modeling error caused by a variation of a vehicle mass due to the number of passengers and load capacity, rolling resistance of the tires, gradient resistance of the road surface and the like can be thought as disturbances, but a disturbance factor dominant just before the vehicle stops is gradient resistance. Disturbance factors differ depending on driving conditions, but the disturbance factors described above can be collectively estimated since the disturbance torque estimator 402 and the disturbance torque estimator 1002 calculate the disturbance torque estimated value Td on the basis of the motor torque command value Tm*, the motor rotation speed ωm and the vehicle model Gp(s). This enables the realization of a smooth vehicle stop from deceleration under any driving condition.

Referring back to FIG. 10, description is continued. An adder 1003 calculates the second torque target value Tm2* by adding the motor rotation speed F/B torque Tω calculated by the motor rotation speed F/B torque setter 1001 and the disturbance torque estimated value Td calculated by the disturbance torque estimator 1002.

A torque comparator 1004 compares the magnitudes of the first and second torque target values Tm1*, Tm2* and sets the larger torque target value as the motor torque command value Tm*. The second torque target value Tm2* is smaller than the first torque target value Tm1* during the travel of the vehicle. When the vehicle decelerates and reaches the just-before-stop moment (vehicle speed is not higher than a predetermined vehicle speed), the second torque target value Tm2* becomes larger than the first torque target value Tm1*. Thus, if the first torque target value Tm1* is larger than the second torque target value Tm2*, the torque comparator 1004 judges that the just-before-stop moment has not been reached and sets the motor torque command value Tm* to the first torque target value Tm1*. Further, when the second torque target value Tm2* becomes larger than the first torque target value Tm1*, the torque comparator 1004 judges that the vehicle will stop shortly and switches the motor torque command value Tm* from the first torque target value Tm1* to the second torque target value Tm2*. It should be noted that the second torque target value Tm2* is a positive torque on an uphill road and a negative torque on a downhill road and converges substantially to zero on a flat road to maintain the vehicle stopped state.

Figure 12:
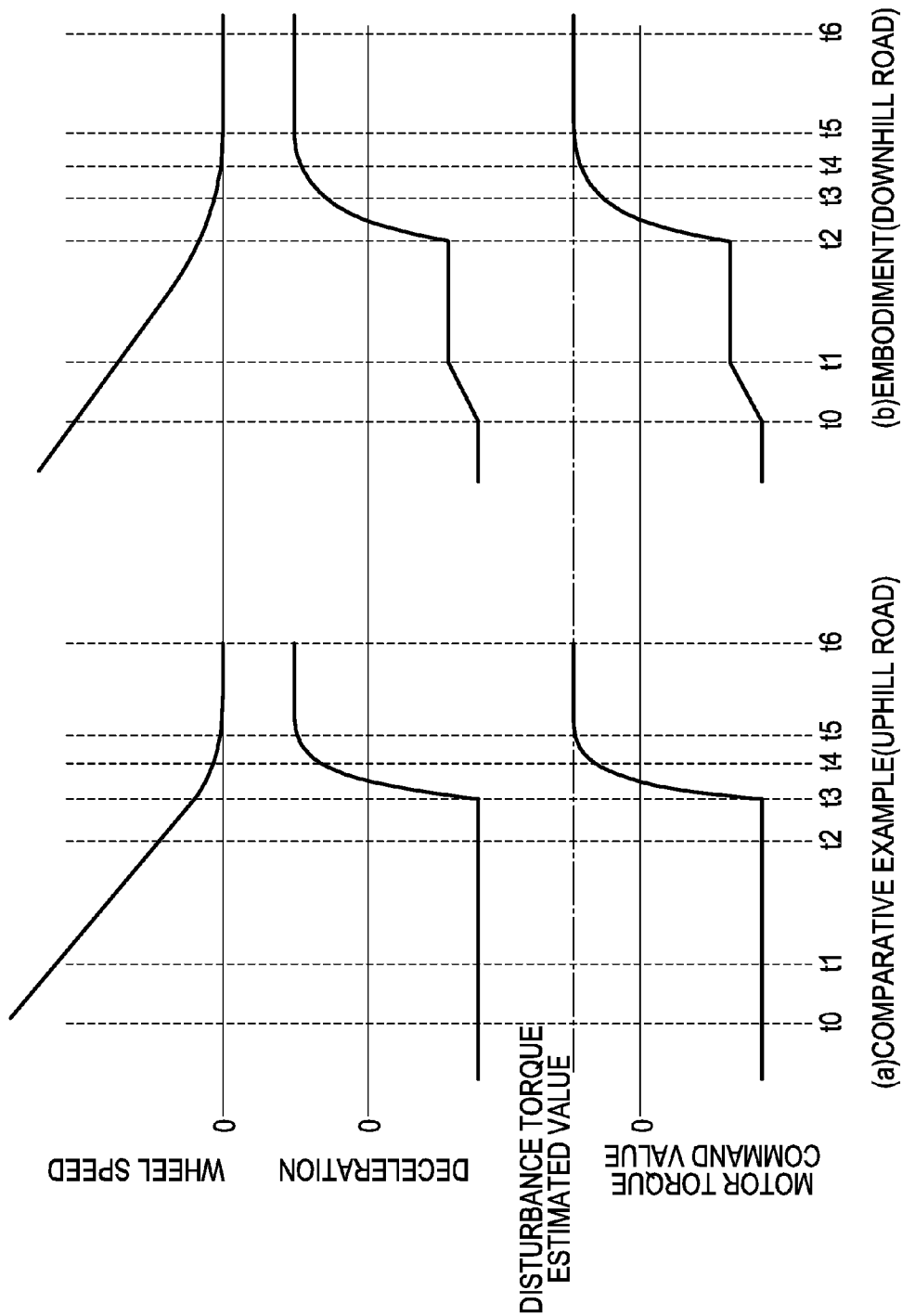
FIGS. 12(a)-12(b) are charts showing control results of a stop control of stopping the electric motor vehicle on an uphill road according to one or more embodiments of the present invention.

FIGS. 12(a)-12(b) are charts showing control results of a stop control of stopping the electric motor vehicle on an uphill road. FIG. 12(a) shows the control result of a comparative example of a configuration in which the torque table target value Tm0* is not corrected in calculating the first torque target value Tm1* (the disturbance torque estimator 402 and the disturbance correction torque setter 403 of FIG. 4 are absent) and FIG. 12(b) shows the control result by the control device for electric motor vehicle according to one or more embodiments of the present invention, wherein a wheel speed, a deceleration and a motor torque command value are successively shown from the top.

In FIG. 12(a), the vehicle is decelerated on the basis of the torque table target value Tm0* calculated on the basis of the accelerator pedal opening and the motor rotation speed up to time t3.

At time t3, it is judged that the vehicle stops shortly due to a reduction of the motor rotation speed ωm to the predetermined rotation speed regardless of the gradient of the road surface and the motor torque command value Tm* is switched from the first torque target value Tm1* to the second torque target value Tm2*. In this way, the motor torque command value Tm* suddenly changes to match the disturbance torque estimated value Td at time t3 to time t5. Due to a sudden change of the motor torque command value Tm*, a driver feels shock due to a torque level difference and a sudden torque change at a switching timing of the motor torque command value. Specifically, since the motor torque command value is switched at the same rotation speed (vehicle speed) regardless of the gradient of the road surface, a change of the motor torque command value is large on the uphill road and the driver is likely to feel shock due to a sudden torque change.

After time t5, the wheel speed becomes 0 and the vehicle stopped state is maintained.

In FIG. 12(b), a section up to time t0 is the high speed region of FIG. 8 and the disturbance correction torque Td* calculated by the disturbance correction torque setter 403 is 0. Thus, up to time t0, the vehicle is decelerated on the basis of the torque table target value Tm0* output from the torque table target value setter 401.

A section from time t0 to time t1 is the medium speed region of FIG. 8. In this section, the disturbance correction torque Td* is calculated by multiplying the gradient correction torque Td5 obtained on the basis of the disturbance torque estimated value Td by the speed correction gain Kω corresponding to the motor rotation speed ωm (speed correction torque setting processor 606 of FIG. 6) and the first torque target value Tm1* is calculated by adding the torque table target value Tm0* output from the torque table target value setter 401 and the disturbance correction torque Td*. Then, the vehicle is decelerated on the basis of the calculated first torque target value Tm1*.

A section after t1 is the low speed region of FIG. 8. In this section, the disturbance correction torque Td* calculated by the disturbance correction torque setter 403 of FIG. 4 is equal to the disturbance torque estimated value Td obtained by the disturbance torque estimator 402 and the first torque target value Tm1* is calculated by adding the torque table target value Tm0* output from the torque table target value setter 401 and the disturbance correction torque Td*. Then, the vehicle is decelerated on the basis of the calculated first torque target value Tm1*.

At time t2, the second torque target value Tm2* becomes larger than the first torque target value Tm1*, the vehicle is judged to stop shortly and the motor torque command value Tm* is switched from the first torque target value Tm1* to the second torque target value Tm2*. This switching timing differs depending on the gradient of the road surface. In this way, the motor torque command value Tm* smoothly changes to converge to the disturbance torque estimated value Td at time t2 to time t5.

At time t5, the motor torque command value Tm* asymptotically converges to the disturbance torque estimated value Td and the motor rotation speed ωm asymptotically converges to zero. In this way, a smooth vehicle stopping free from acceleration vibrations is possible. After time t5, the vehicle stopped state is maintained.

Specifically, according to the control device for electric motor vehicle according to one or more embodiments of the present invention, the disturbance correction torque Td* is calculated on the basis of the disturbance torque estimated value, whether or not the vehicle stops shortly is judged also considering the calculated disturbance correction torque Td* and the motor torque command value Tm* is switched from the first torque target value Tm1* to the second torque target value Tm2*. Thus, smooth deceleration and vehicle stopping equivalent to those on flat roads can also be realized on uphill roads.

Figure 13:
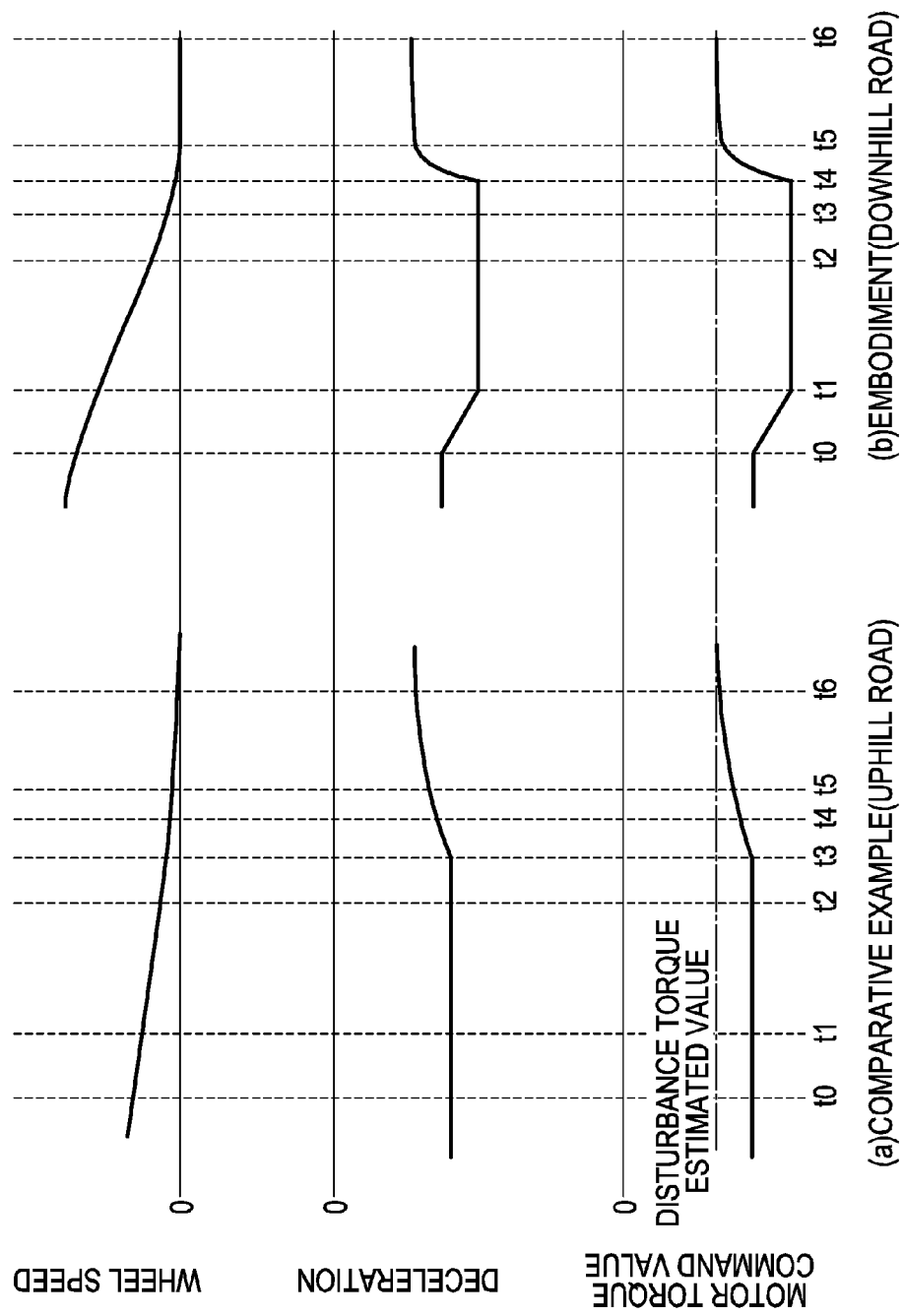
FIGS. 13(a)-13(b) are charts showing control results of a stop control of stopping the electric motor vehicle on a downhill road according to one or more embodiments of the present invention.

FIGS. 13(a)-13(b) are charts showing control results of a stop control of stopping the electric motor vehicle on a downhill road. FIG. 13(a) shows the control result of a comparative example of a configuration in which the torque table target value Tm0* is not corrected in calculating the first torque target value Tm1* (the disturbance torque estimator 402 and the disturbance correction torque setter 403 of FIG. 4 are absent) and FIG. 13(b) shows the control result by the control device for electric motor vehicle according to one or more embodiments of the present invention, wherein the wheel speed, the deceleration and the motor torque command value are successively shown from the top.

In FIG. 13(a), the vehicle is decelerated on the basis of the torque table target value Tm0* calculated on the basis of the accelerator pedal opening and the motor rotation speed up to time t3.

At time t3, it is judged that the vehicle stops shortly due to a reduction of the motor rotation speed ωm to the predetermined rotation speed regardless of the gradient of the road surface and the motor torque command value Tm* is switched from the first torque target value Tm1* to the second torque target value Tm2*. In this way, at time t3 to time t6, a time until the vehicle stops and a stopping distance become longer and the drive feeling is deteriorated due to a slow torque change, whereby a smooth vehicle stop is impaired. Specifically, in the configuration of the comparative example in which the motor torque command value is switched at the same rotation speed (vehicle speed) regardless of the gradient of the road surface, a time until the motor torque command value Tm* converges to the disturbance torque estimated value Td becomes longer and the drive feeling is deteriorated on downhill roads.

After time t6, the wheel speed becomes 0 and the vehicle stopped state is maintained.

In FIG. 13(b), a section up to time t0 is the high speed region of FIG. 8 and the disturbance correction torque Td* calculated by the disturbance correction torque setter 403 is 0. Thus, up to time t0, the vehicle is decelerated on the basis of the torque table target value Tm0* output from the torque table target value setter 401.

A section from time t0 to time t1 is the medium speed region of FIG. 8. In this section, the disturbance correction torque Td* is calculated by multiplying the gradient correction torque Td5 obtained on the basis of the disturbance torque estimated value Td by the speed correction gain Kω corresponding to the motor rotation speed ωm (speed correction torque setting processor 606 of FIG. 6) and the first torque target value Tm1* is calculated by adding the torque table target value Tm0* output from the torque table target value setter 401 and the disturbance correction torque Td*. Then, the vehicle is decelerated on the basis of the calculated first torque target value Tm1*.

A section after t1 is the low speed region of FIG. 8. In this section, the disturbance correction torque Td* calculated by the disturbance correction torque setter 403 of FIG. 4 is equal to the disturbance torque estimated value Td obtained by the disturbance torque estimator 402 and the first torque target value Tm1* is calculated by adding the torque table target value Tm0* output from the torque table target value setter 401 and the disturbance correction torque Td*. Then, the vehicle is decelerated on the basis of the calculated first torque target value Tm1*.

At time t4, the second torque target value Tm2* becomes larger than the first torque target value Tm1*, the vehicle is judged to stop shortly and the motor torque command value Tm* is switched from the first torque target value Tm1* to the second torque target value Tm2*. This switching timing differs depending on the gradient of the road surface.

At time t5, the motor torque command value Tm* asymptotically converges to the disturbance torque estimated value Td and the motor rotation speed ωm asymptotically converges to zero. In this way, a smooth vehicle stopping free from acceleration vibrations is possible. After time t5, the vehicle stopped state is maintained.

Specifically, according to the control device for electric motor vehicle according to one or more embodiments of the present invention, the disturbance correction torque Td* is calculated on the basis of the disturbance torque estimated value and whether or not the vehicle stops shortly is judged (the timing of switching the motor torque command value Tm* from the first torque target value Tm1* to the second torque target value Tm2* is determined) also considering the calculated disturbance correction torque Td*. Thus, smooth deceleration and vehicle stopping equivalent to those on flat roads can also be realized on downhill roads.

Figure 14:
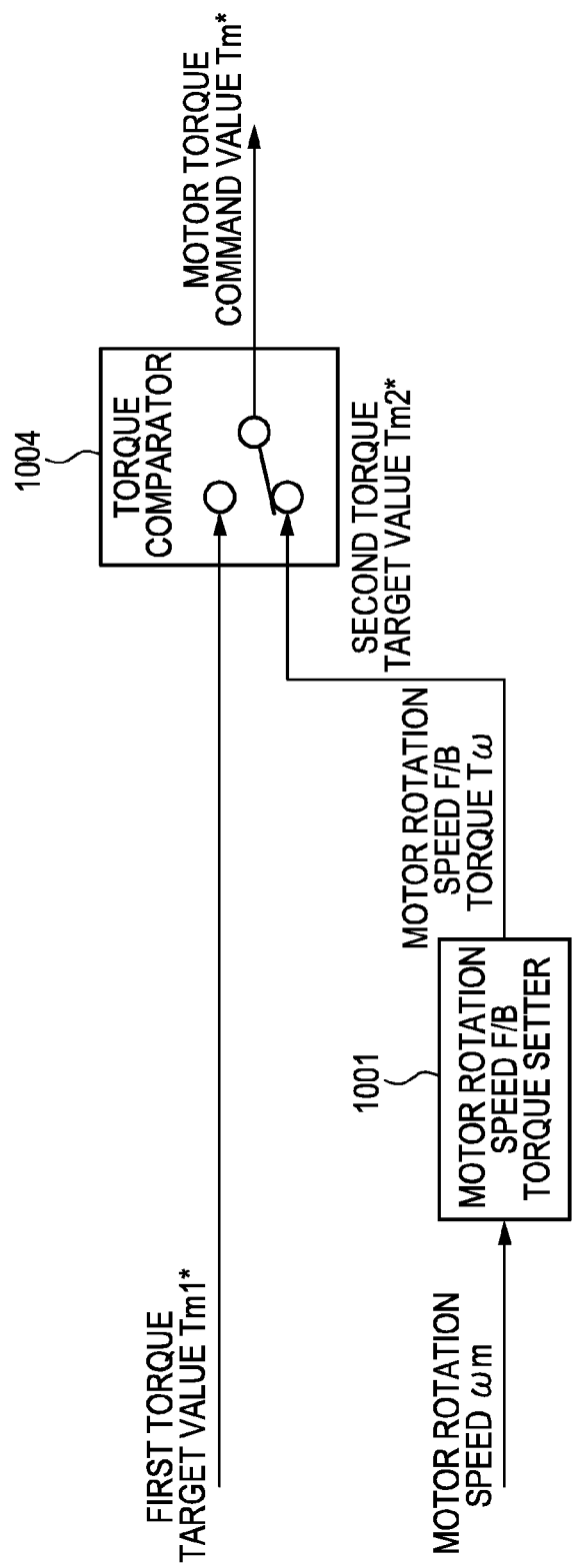
FIG. 14 is a block diagram for realizing the stop control process in the case of setting the motor rotation speed F/B torque $T\omega$ as a second torque target value Tm2* according to one or more embodiments of the present invention.

Here, although the second torque target value Tm2* is calculated by adding the motor rotation speed F/B torque Tω and the disturbance torque estimated value Td in the above description, the motor rotation speed F/B torque Tω may be set as the second torque target value Tm2*. FIG. 14 is a block diagram for realizing the stop control process in the case of setting the motor rotation speed F/B torque Tω as the second torque target value Tm2*. In FIG. 14, the same constituent elements as those shown in FIG. 10 are denoted by the same reference signs. In this case, the disturbance torque estimated value Td is computed as zero in calculating the first torque target value Tm1* (FIG. 4).

Also in the case of setting the motor rotation speed F/B torque Tω as the second torque target value Tm2*, the motor torque command value Tm* is switched from the first torque target value Tm1* to the second torque target value Tm2* when the second torque target value Tm2* becomes larger than the first torque target value Tm1* and the vehicle is judged to stop shortly. At this time, the motor torque command value Tm* converges to zero as the motor rotation speed ωm decreases since the second torque target value Tm2* is substantially equal to the motor rotation speed F/B torque Tω.

As described above, the control device for electric motor vehicle according to one or more embodiments of the present invention is a control device for an electric motor vehicle using the electric motor 4 as a traveling drive source and configured to be decelerated by a regenerative braking force of the electric motor 4 and calculates the first torque target value Tm1* on the basis of vehicle information and calculates the second torque target value Tm2* that converges to zero as the motor rotation speed ωm decreases. The first torque target value Tm1* is set as the motor torque command value Tm* when the vehicle is determined to have not reached the just-before-stop moment, and the second torque target value Tm2* is set as the motor torque command value Tm* when the vehicle is determined to stop shortly. The electric motor 4 is controlled on the basis of the set motor torque command value Tm*. Specifically, since the motor torque command value Tm* is switched from the first torque target value Tm1* to the second torque target value Tm2* just before the vehicle stops after the vehicle is decelerated on the basis of the first torque target value Tm1* based on the vehicle information, a smooth vehicle stop from deceleration can be realized. This enables the realization of smooth deceleration and vehicle stopping free from acceleration vibrations in the front-back direction on flat roads. Further, since the vehicle can be decelerated up to the vehicle stopped state even without using the braking force by mechanical braking means such as a foot brake, the regenerative operation of the electric motor 4 is possible also just before the vehicle stops and electric power consumption can be improved. Furthermore, since the acceleration/deceleration and the stop of the vehicle can be realized only by the accelerator operation, it is not necessary to switchingly depress the accelerator pedal and a brake pedal and burdens on the driver can be reduced.

In the case of stopping the vehicle using the brake pedal, a driver not used to driving depresses the accelerator pedal too much to generate acceleration vibrations in the front-back direction of the vehicle when the vehicle stops. Further, if it is attempted to realize the deceleration and the stop of the vehicle at a constant deceleration in the vehicle for realizing the acceleration/deceleration and the stop of the vehicle only by the accelerator operation, the deceleration needs to be increased to realize a sufficient deceleration during deceleration. Thus, acceleration vibrations are generated in the front-back direction of the vehicle when the vehicle stops. However, according to the control device for electric motor vehicle according to one or more embodiments of the present invention, any driver can realize smooth deceleration and vehicle stopping only by the accelerator operation as described above.

Further, according to the control device for electric motor vehicle according to one or more embodiments of the present invention, the vehicle is determined to have not reached the just-before-stop moment if the first torque target value Tm1* is larger than the second torque target value Tm2* while being determined to stop shortly if the second torque target value Tm2* is larger than the first torque target value Tm1*. Thus, the motor torque command value Tm* can be switched from the first torque target value Tm1* to the second torque target value Tm2* without generating a torque level difference just before the vehicle stops. Further, since the larger one of the first and second torque target values Tm1*, Tm2* is set as the motor torque command value Tm*, smooth deceleration can be realized without generating a torque level difference at the switching timing of the torque target value at any gradient.

Particularly, according to the control device for electric motor vehicle according to one or more embodiments of the present invention, the disturbance torque estimated value Td is obtained and the torque target value that converges to the disturbance torque estimated value Td as the motor rotation speed ωm decreases is calculated as the second torque target value Tm2*. Thus, regardless of whether it is an uphill road, a downhill road or a flat road, smooth deceleration free from acceleration vibrations in the front-back direction can be realized just before the vehicle stops and the vehicle stopped state can be held.

Since the disturbance torque estimated value Td is estimated to be a positive value on an uphill road and a negative value on a downhill road, the vehicle can also smoothly stop on slopes and the vehicle stopped state can be held without requiring the foot brake. Further, since the disturbance torque estimated value Td is estimated to be zero on a flat road, the vehicle can smoothly stop and the vehicle stopped state can be held without requiring the foot brake also on flat roads.

Further, since the first torque target value Tm1* is calculated by calculating the torque table target value Tm0* on the basis of the vehicle information and correcting the calculated torque table target value Tm0* on the basis of the disturbance torque estimated value Td, the deceleration until the just-before-stop moment is determined and can be adjusted on the basis of the disturbance torque estimated value Td. In this way, a torque change amount from the motor torque command value Tm* before the just-before-stop moment to the disturbance torque estimated value Td to which the motor torque command value Tm* converges when the vehicle stopping can be suppressed, and the drive feeling can be improved by suppressing a shock due to a torque change.

Particularly, since the disturbance correction torque Td* is calculated by multiplying the disturbance torque estimated value Td by the predetermined gain (Kup, Kdown) and the first torque target value Tm1* is calculated by adding the torque table target value Tm0* and the disturbance correction torque Td*, the first torque target value Tm1* can be calculated by linearly correcting the torque table target value Tm0* in accordance with a disturbance.

Further, the disturbance correction torque Td* is calculated by multiplying a product of the disturbance torque estimated value Td and the predetermined gain (Kup, Kdown) by the speed correction gain Kω corresponding to the motor rotation speed ωm, and the speed correction gain Kω is 1 if the motor rotation speed ωm is lower than the first predetermined rotation speed ωm1, 0 if the motor rotation speed ωm is higher than the second predetermined rotation speed ωm2 higher than the first predetermined rotation speed ωm1, and a value not smaller than 0 and not larger than 1 and closer to 0 as the motor rotation speed ωm increases if the motor rotation speed ωm is not lower than the first predetermined rotation speed ωm1 and not higher than the second predetermined rotation speed ωm2. The disturbance toque in the high speed region is dominantly air resistance. Acceleration/deceleration feeling in the high speed region can be matched with the drive feeling by reducing the disturbance correction torque Td* as the motor rotation speed ωm increases.

The present invention is not limited to the embodiments described above. For example, in the above description, the second torque target value Tm2* is the torque target value that converges to the disturbance torque estimated value Td with a reduction in the motor rotation speed ωm. However, since speed parameters such as the wheel speed, the vehicle body speed and the rotation speed of the drive shaft are in a proportional relationship with the rotation speed of the electric motor 4, the second torque target value Tm2* may be caused to converge to the disturbance torque estimated value Td (or zero) with a reduction in the speed parameter proportional to the rotation speed of the electric motor 4.

Although embodiments of the present invention are described above, the above embodiments are merely examples, and not intended to limit the technical scope of the present invention to the specific configurations set forth above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for an electric motor vehicle using an electric motor as a traveling drive source, comprising:
a motor controller configured to:
decelerate the electric motor vehicle by a regenerative braking force of the electric motor,
set a first torque target value for traveling based on vehicle information as a motor torque command value for traveling based on the vehicle information before a speed parameter proportional to a traveling speed of the electric motor vehicle becomes equal to or less than a predetermined value,
set a second torque target value for stopping the electric motor vehicle and maintaining a vehicle stopped state as the motor torque command value when the speed parameter becomes equal to or less than the predetermined value, and
control the electric motor on the basis of the motor torque command value,
wherein the motor controller stops the electric motor vehicle and maintains the electric motor vehicle stopped state by the second torque target value as the motor torque command value when the speed parameter becomes equal to or less than the predetermined value.

2. The control device for the electric motor vehicle according to claim 1,
wherein the motor controller is configured to determine whether the electric motor vehicle is at a just-before-stop moment, which is a point in time before the electric motor vehicle stops, and
wherein the motor controller determines that the just-before-stop moment has not been reached when the first torque target value is larger than the second torque target value, and determines that the just-before-stop moment has been reached when the second torque target value is larger than the first torque target value.

3. The control device for the electric motor vehicle according to claim 1,
wherein the motor controller is configured to estimate a disturbance torque,
wherein the motor controller is configured to calculate a torque target value as the second torque target value, and
wherein the torque target value converges to the disturbance torque with a reduction in the speed parameter.

4. The control device for the electric motor vehicle according to claim 3,
wherein the motor controller estimates the disturbance torque to be a positive value on an uphill road and a negative value on a downhill road.

5. The control device for the electric motor vehicle according to claim 3,
wherein the motor controller zeros the disturbance torque on a flat road.

6. The control device for the electric motor vehicle according to claim 3,
wherein the motor controller is configured to:
calculate a basic torque target value on the basis of the vehicle information, and
calculate the first torque target value by correcting the calculated basic torque target value on the basis of the disturbance torque.

7. The control device for the electric motor vehicle according to claim 6,
wherein the motor controller calculates a disturbance correction torque by multiplying the disturbance torque by a predetermined gain and calculates the first torque target value by adding the basic torque target value and the disturbance correction torque.

8. The control device for the electric motor vehicle according to claim 7,
wherein the motor controller calculates the disturbance correction torque by multiplying a product of the disturbance torque and the predetermined gain by a speed correction gain corresponding to the speed parameter, and
wherein the speed correction gain is 1 when the speed parameter is smaller than a first predetermined value, 0 when the speed parameter is larger than a second predetermined value larger than the first predetermined value, and a value not smaller than 0 and not larger than 1 and closer to 0 as the speed parameter increases when the speed parameter is not smaller than the first predetermined value and not larger than the second predetermined value.

9. A control method performed by a motor controller for an electric motor vehicle using an electric motor as a traveling drive source, the method comprising:
   a step of decelerating the electric motor vehicle by a regenerative braking force of the motor;
   a step of setting, by the motor controller, a first torque target value for traveling based on vehicle information as a motor torque command value before a speed parameter proportional to a traveling speed of the electric motor vehicle becomes equal to or less than a predetermined value, and setting a second torque target value as the motor torque command value when the speed parameter becomes equal to or less than the predetermined value; and
   a step of controlling the electric motor on the basis of the motor torque command value,
   wherein, in the step of controlling the electric motor, the electric motor vehicle is stopped and the electric motor vehicle stopped state is maintained by the second torque target value as the motor torque command value when the speed parameter becomes equal to or less than the predetermined value.

10. The control method performed by the motor controller for the electric motor vehicle according to claim 9, the method further comprising:
    a step of determining whether the electric motor vehicle is at a just-before-stop moment, which is a point in time before the electric motor vehicle stops,
    wherein, in the step of determining, the electric motor vehicle is determined to have not reached the just-before-stop moment when the first torque target value is larger than the second torque target value, and the electric motor vehicle is determined just-before-stop moment has been reached when the second torque target value is larger than the first torque target value.

11. The control method performed by the motor controller for the electric motor vehicle according to claim 9, further comprising:
    a step of estimating a disturbance torque,
    wherein a torque target value is calculated as the second torque target value, and
    wherein the torque target value converges to the disturbance torque with a reduction in the speed parameter.

12. The control method performed by the motor controller for the electric motor vehicle according to claim 11,
    wherein the disturbance torque is estimated as a positive value on an uphill road and as a negative value on a downhill road.

13. The control method performed by the motor controller for the electric motor vehicle according to claim 11,
    wherein the disturbance torque is estimated as zero on a flat road.

14. The control method performed by the motor controller for the electric motor vehicle according to claim 11,
    wherein a basic torque target value is calculated on the basis of the vehicle information, and
    wherein the first torque target value is calculated by correcting the calculated basic torque target value on the basis of the disturbance torque.

15. The control method performed by the motor controller for the electric motor vehicle according to claim 14,
    wherein a disturbance correction torque is calculated by multiplying the disturbance torque by a predetermined gain, and
    wherein the first torque target value is calculated by adding the basic torque target value and the disturbance correction torque.

16. The control method performed by the motor controller for the electric motor vehicle according to claim 15,
    wherein the disturbance correction torque is calculated by multiplying a product of the disturbance torque and the predetermined gain by a speed correction gain corresponding to the speed parameter, and
    wherein the speed correction gain is 1 when the speed parameter is smaller than a first predetermined value, 0 when the speed parameter is larger than a second predetermined value larger than the first predetermined value, and a value not smaller than 0 and not larger than 1 and closer to 0 as the speed parameter increases when the speed parameter is not smaller than the first predetermined value and not larger than the second predetermined value.

* * * * *